(12) United States Patent
Abdeldaim

(10) Patent No.: US 12,486,742 B2
(45) Date of Patent: Dec. 2, 2025

(54) DOWNHOLE GENERATOR WITH SURFACE COMMAND LOAD SWITCHING

(71) Applicant: Baker Hughes Oilfield Operations LLC, Houston, TX (US)

(72) Inventor: Rawshan Mostafa Abdeldaim, Salmiya (KW)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/655,052

(22) Filed: May 3, 2024

(65) Prior Publication Data

US 2025/0341155 A1    Nov. 6, 2025

(51) Int. Cl.
*E21B 43/12* (2006.01)
*E21B 41/00* (2006.01)

(52) U.S. Cl.
CPC ........ *E21B 43/128* (2013.01); *E21B 41/0085* (2013.01)

(58) Field of Classification Search
CPC ..... E21B 41/0085; E21B 43/128; H02K 1/12; H02K 1/22
See application file for complete search history.

(56) References Cited

U.S. PATENT DOCUMENTS

| | | | |
|---|---|---|---|
| 6,279,651 B1 | 8/2001 | Schwendemann et al. | |
| 9,985,690 B2 | 5/2018 | Rendusara et al. | |
| 10,167,871 B1 | 1/2019 | Chen et al. | |
| 11,555,505 B2 | 1/2023 | Xiao et al. | |
| 2015/0027735 A1* | 1/2015 | Murphree | E21B 34/066 166/66.4 |
| 2015/0098793 A1 | 4/2015 | Baski | |
| 2015/0114632 A1* | 4/2015 | Romer | E21B 43/168 166/305.1 |
| 2015/0345265 A1 | 12/2015 | Cunningham | |
| 2018/0183377 A1 | 6/2018 | McMullen | |
| 2020/0072245 A1 | 3/2020 | Chen et al. | |
| 2021/0372274 A1 | 12/2021 | Steele et al. | |
| 2021/0372276 A1 | 12/2021 | Steele et al. | |
| 2022/0003089 A1 | 1/2022 | Artinian et al. | |
| 2022/0049695 A1 | 2/2022 | Romer et al. | |

(Continued)

FOREIGN PATENT DOCUMENTS

WO       2021243370 A1    12/2021

*Primary Examiner* — Brad Harcourt
(74) *Attorney, Agent, or Firm* — Baker Hughes Company

(57) ABSTRACT

A downhole pumping system is configured for producing fluids from a subterranean geologic formation. The downhole pumping system includes an electric motor driven by a motor drive located on the surface, a power cable connected between the motor drive and the electric motor, a pump driven by the electric motor, an auxiliary load, and a generator module driven by the electric motor and configured to provide power to the auxiliary load. The generator module includes an electrical generator and a load switch connected between the electrical generator and the auxiliary load. The load switch is configured to connect and disconnect power to the auxiliary load in response to a switch command signal transmitted by the motor drive. The generator module may also include a battery and charge controller, which can be configured to automatically charge the battery from the generator and provide the load switch with power from the battery.

16 Claims, 4 Drawing Sheets

(56) References Cited

U.S. PATENT DOCUMENTS

2024/0352830 A1* 10/2024 McChesney ......... H02K 7/1823
2024/0352831 A1* 10/2024 Mufleh ................ E21B 43/128
2024/0380278 A1* 11/2024 Fastovets ............... F03B 13/02

* cited by examiner

DOWNHOLE GENERATOR WITH SURFACE COMMAND LOAD SWITCHING

FIELD OF THE INVENTION

This invention relates generally to the field of submersible pumping systems, and more particularly, but not by way of limitation, to an electric submersible pumping system that includes an electrical generator configured to provide power to downhole accessories.

BACKGROUND OF THE INVENTION

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Typically, electricity is generated on the surface and supplied to the motor through a heavy-duty power cable. The power cable typically includes several separate conductors that are individually insulated within the power cable. Power cables are often constructed in round or flat configurations.

In addition to the primary components outlined above, there are also auxiliary components that can be used in connection with the electric submersible pumping system. Flow meters, gauges, sensors and other components can be incorporated into the electric submersible pumping system to improve functionality and reliability. These auxiliary components are often powered by direct current (DC) electricity, which can be difficult to access in the downhole environment, particularly for electric submersible pumping systems in which the motor is driven by alternating current (AC). There is, therefore, a need for an improved electric submersible pumping system that provides a system for providing electrical power to downhole auxiliary components. It is to these and other deficiencies in the prior art that the present invention is directed.

SUMMARY OF THE INVENTION

In one aspect, embodiments of the present disclosure are directed to a downhole pumping system for use in producing fluids from a formation to a surface through a wellbore. The downhole pumping system includes an electric motor, a pump driven by the electric motor, an auxiliary load, and a generator module driven by the electric motor and configured to provide power to the auxiliary load. The generator module includes an electrical generator and a load switch connected between the electrical generator and the auxiliary load. The load switch is configured to connect and disconnect power to the auxiliary load in response to a switch command signal.

In other embodiments, the present disclosure provides a downhole pumping system for use in producing fluids from a formation to a surface through a wellbore, where the downhole pumping system includes an electric motor driven by a motor drive located on the surface, a power cable connected between the motor drive and the electric motor, a pump driven by the electric motor, an auxiliary load, and a generator module driven by the electric motor and configured to provide power to the auxiliary load. The generator module includes an electrical generator and a load switch connected between the electrical generator and the auxiliary load. The load switch is configured to connect and disconnect power to the auxiliary load in response to a switch command signal transmitted by the motor drive through the power cable. The generator module may also include a battery and a charge controller connected between the battery and the load switch.

In yet other embodiments, the present disclosure is directed to a method of providing electric power to an auxiliary load within a downhole pumping system. The method includes the steps of providing a generator within the downhole pumping system, driving the generator with an electric motor within the downhole pumping system to generate an electric current within the generator, and actuating a load switch between the generator and the auxiliary load to selectively conduct the electric current from the generator to the auxiliary load. In some embodiments, the step of actuating the load switch includes sending a switch command signal to the load switch. In some embodiments, the step of sending the switch command signal includes transmitting the switch command signal as a direct current (DC) signal to the load switch through power cables connected to the electric motor.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. It will be understood that the depictions in these drawings are intended to demonstrate the underlying concepts covered by presently contemplated embodiments, but these depictions should not be interpreted as limiting the scope of protection otherwise afforded by the appended claims. Within these drawings, like reference numerals designate like elements throughout the several drawings.

DETAILED DESCRIPTION

Figure 1:
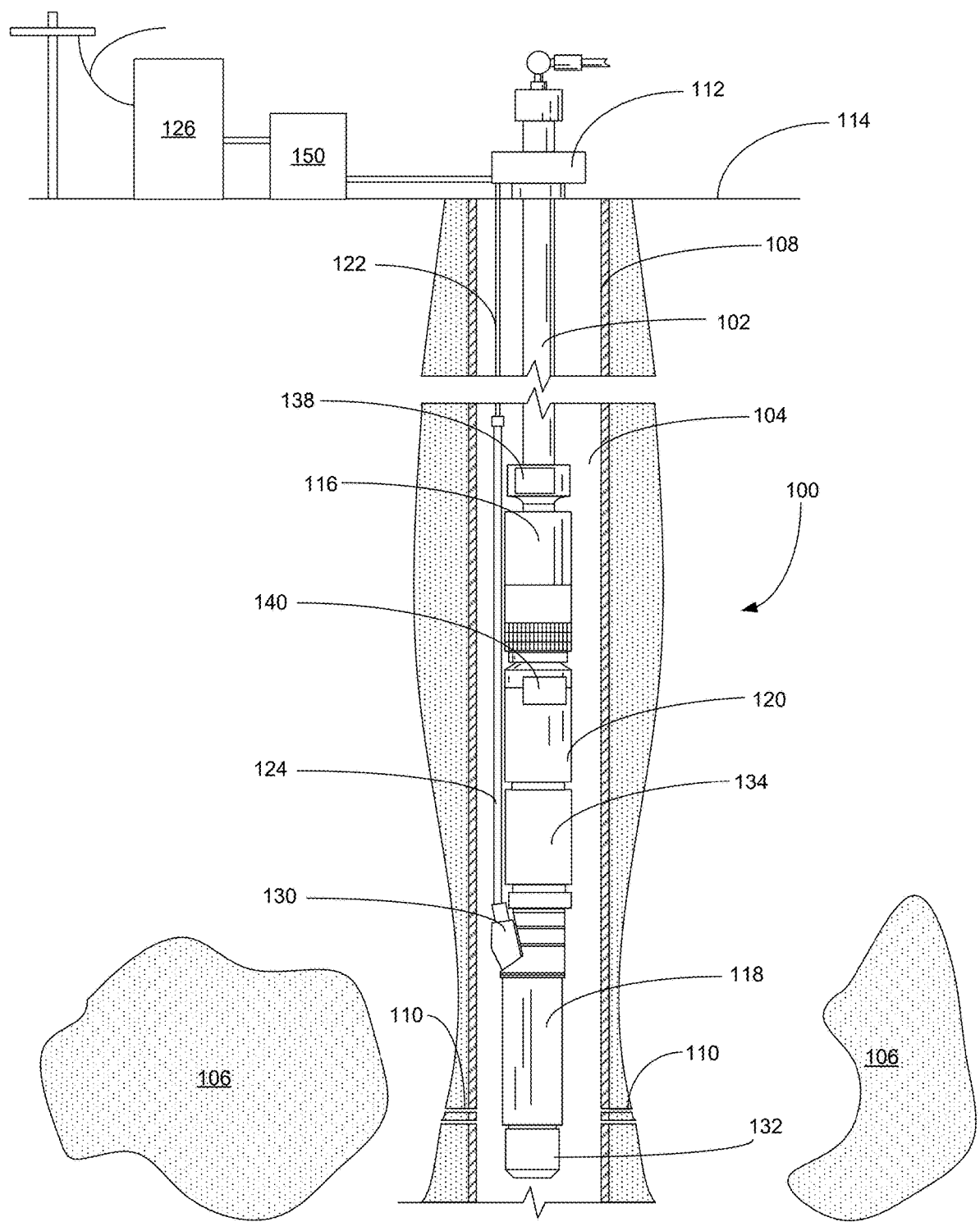
FIG. 1 is an elevational depiction of an electric submersible pumping system.

In accordance with an exemplary embodiment of the present invention, FIG. 1 shows a front view of a downhole pumping system 100 attached to production tubing 102. The downhole pumping system 100 and production tubing 102 are disposed in a wellbore 104, which is drilled for the production of a fluid such as water or petroleum from a subterranean geologic formation 106.

The wellbore 104 includes a casing 108, which has perforations 110 that permit the exchange of fluids between the wellbore 104 and the geologic formation 106. Although the downhole pumping system 100 is depicted in a vertical well, it will be appreciated that the downhole pumping system 100 can also be used in horizontal, deviated, and other non-vertical wells. Accordingly, the terms "upper" and "lower" should not be construed as limiting the disclosed embodiments to use in vertical wells.

The production tubing 102 connects the pumping system 100 to a wellhead 112 located on the surface 114, which may be onshore or offshore. Although the pumping system 100 is primarily designed to pump petroleum products, it will be understood that the present invention can also be used to move other fluids.

The pumping system 100 includes a pump 116, a motor 118 and a seal section 120. The motor 118 is an electric motor that receives its power from a surface-based supply through a power cable 122 and one or more motor lead extensions 124. In many embodiments, the power cable 122 and motor lead extension 124 are configured to supply the motor 118 with three-phase electricity from a surface-based variable speed (or variable frequency) motor drive 126, which receives electricity from a power source 128. The electricity is carried along separate conductors (not separately designated), which each correspond to a separate phase of the electricity. The motor lead extension 124 connects to the motor 118 through a connector 130, which is often referred to as a "pothead" connector. The motor lead extension 124 extends into the pothead 130, where it terminates in a connection to the conductor leads of the motor 118. The pothead connector 130 relieves mechanical stresses between the motor lead extension 124 and the motor 118, while providing a sealed connection that prevents the ingress of wellbore fluids into the motor 118, motor lead extension 124, or pothead 130.

The motor 118 converts the electrical energy into mechanical energy, which is transmitted to the pump 116 by one or more shafts. The pump 116 then transfers a portion of this mechanical energy to fluids within the wellbore 104, causing the wellbore fluids to move through the production tubing 102 to the surface 114. In some embodiments, the pump 116 is a turbomachine that uses one or more impellers and diffusers to convert mechanical energy into pressure head. In other embodiments, the pump 116 is a progressive cavity (PC) or positive displacement pump that moves wellbore fluids with one or more screws or pistons.

The seal section 120 shields the motor 118 from mechanical thrust produced by the pump 116. The seal section 120 is also configured to prevent the introduction of contaminants from the wellbore 104 into the motor 118, while also accommodating the thermal expansion and contraction of lubricants within the motor 118. Although only one pump 116, seal section 120 and motor 118 are shown, it will be understood that the downhole pumping system 100 could include additional pumps 116, seal sections 120 or motors 118.

The pumping system 100 also includes a gauge or sensor module 132 connected to the motor 118. As depicted in FIG. 1, the motor 118 is positioned between the sensor module 132 and the seal section 120. In other embodiments, the sensor module 132 can be located elsewhere in the pumping system 100, for example, between the motor 118 and the seal section 120. The sensor module 132 includes internal sensors and circuits for receiving and processing signals from remote sensors configured to measure operational and environmental conditions at the pumping system 100, as well as communications circuits for transmitting and receiving data from equipment located on the surface 114 or elsewhere in the wellbore 104.

The pumping system 100 further includes a generator module 134, which can be used to provide electrical power to one or more auxiliary loads 136 within the pumping system 100. As depicted in FIG. 1, for example, the auxiliary loads 136 include a flow meter 138 and an intake heater 140, which are both connected to the pump 116.

Figure 2:
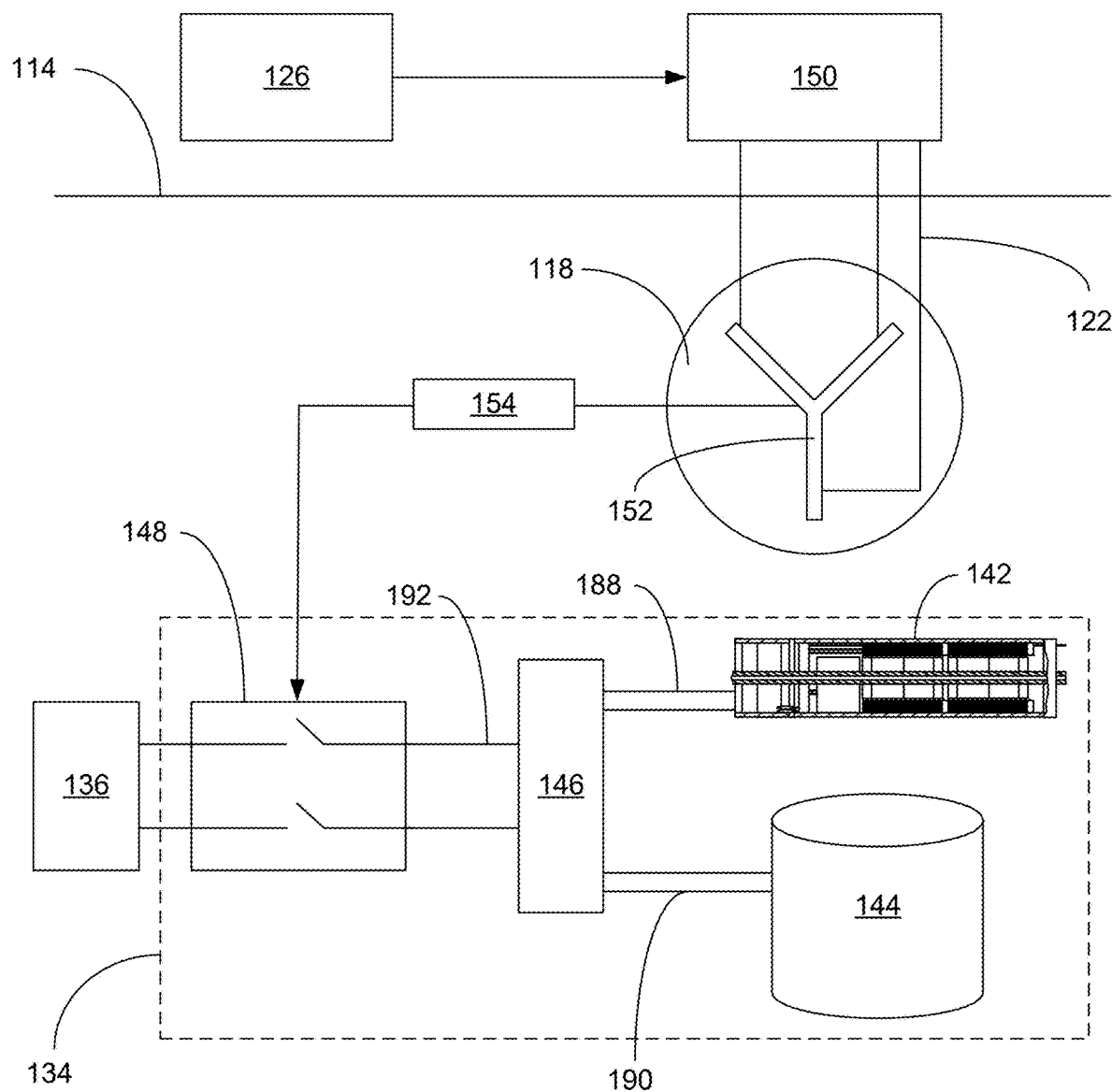
FIG. 2 is a block diagram depicting the connections between the surface facilities, the motor and the downhole generator system.

Turning to FIG. 2, shown therein is a functional block diagram depicting the generator module 134 and associated components. The generator module 134 includes a generator 142, a battery 144, a charge controller 146, a load switch 148, and a downhole choke 154. The charge controller 146 is electrically connected to the generator 142, the battery 144 and the load switch 148. The charge controller 146 is configured to automatically control the output from the generator 142 and maintain the charge on the battery 144. In exemplary embodiments, the charge controller 146 is configured to automatically ensure that the battery 144 is fully or sufficiently charged. When an auxiliary load 136 is selectively connected to the battery 144 through the load switch 148, the charge controller 146 controls the discharge of current from the battery 144 to the auxiliary load 136. It will be appreciated that the charge controller 146 can include additional components, including an internal or external load bank for taking unused charge from the generator 142, and an automatic voltage regulator (AVR) that is configured to automatically adjust the voltage of the current from the generator 142 before the current is provided by the charge controller 146 to the battery 144 and auxiliary loads 136. In exemplary embodiments, the generator module 134 is configured to generate, store and supply direct current (DC) power. In some embodiments, the generator module 134 can be configured to output an alternating current (AC) power. In yet other embodiments, the generator module 134 can be configured to output both AC and DC power.

The load switch 148 is configured to connect and disconnect the output from the charge controller 146 to the auxiliary loads 136 or any other connected load within the pumping system 100. Although a single load switch 148 is depicted in FIG. 2, it will be appreciated that the generator module 134 can include multiple load switches 148, where each of the multiple load switches 148 is configured to operate a different auxiliary load 136. Each load switch 148 is operated by a switch command signal. In some embodiments, the load switch 148 is integrated into the charge controller 146. The switch command signal can be configured to open or close the load switch 148. In some embodiments, the load switch 148 provides binary, on-off switching functionality. In other embodiments, the load switch 148 is configured to adjust the characteristics of the power, e.g., with adjustable resistive, capacitive or inductive components.

In some embodiments, the switch command signal is a DC signal that is carried from the surface 114 to the load switch 148 through the power cable 122, motor lead extensions 124 and motor 118. A surface choke 150 can be used to inject the DC switch command signal onto the AC power delivered from the motor drive 126 along the power cable 122. In some embodiments, the switch command signal is delivered to a wye point connector 152 in the motor 118. The downhole choke 154 can be positioned between the wye point connector 152 and the load switch 148 to absorb and condition the switch command signal before it reaches the load switch 148. In this way, the load switch 148 can selectively connect or disconnect the auxiliar loads 136 from the output from the generator module 134 using a switch command signal that is manually or automatically generated on the surface 114 or from onboard electronics within the downhole pumping system 100. The motor drive 126, for example, can be configured to automatically present the switch command signal in response to measurements or conditions of the pumping system 100 or hydrocarbon production from the wellbore 104.

Figure 3:
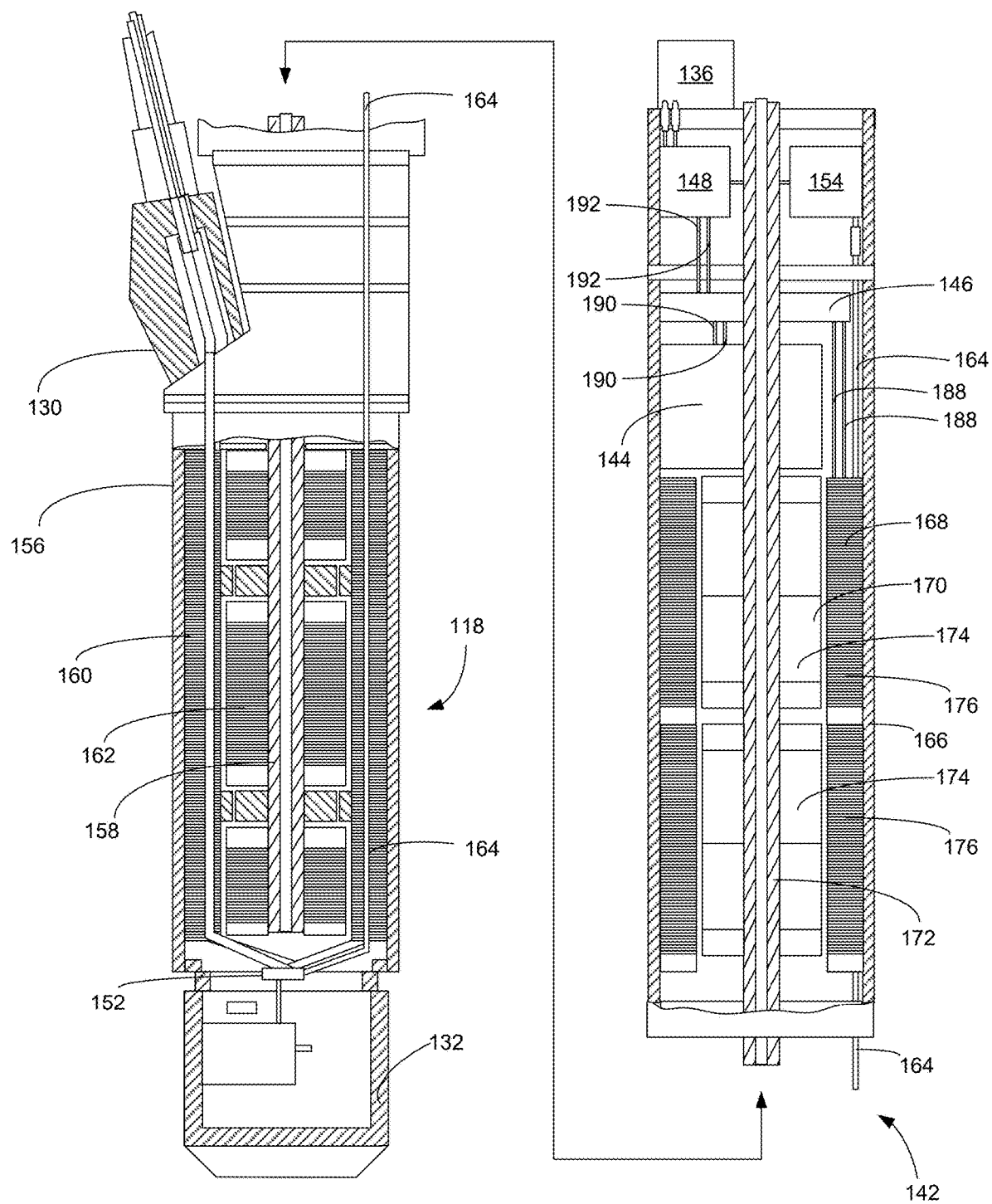
FIG. 3 is a cross-sectional view of a first embodiment of the motor and downhole generator system.
Figure 4:
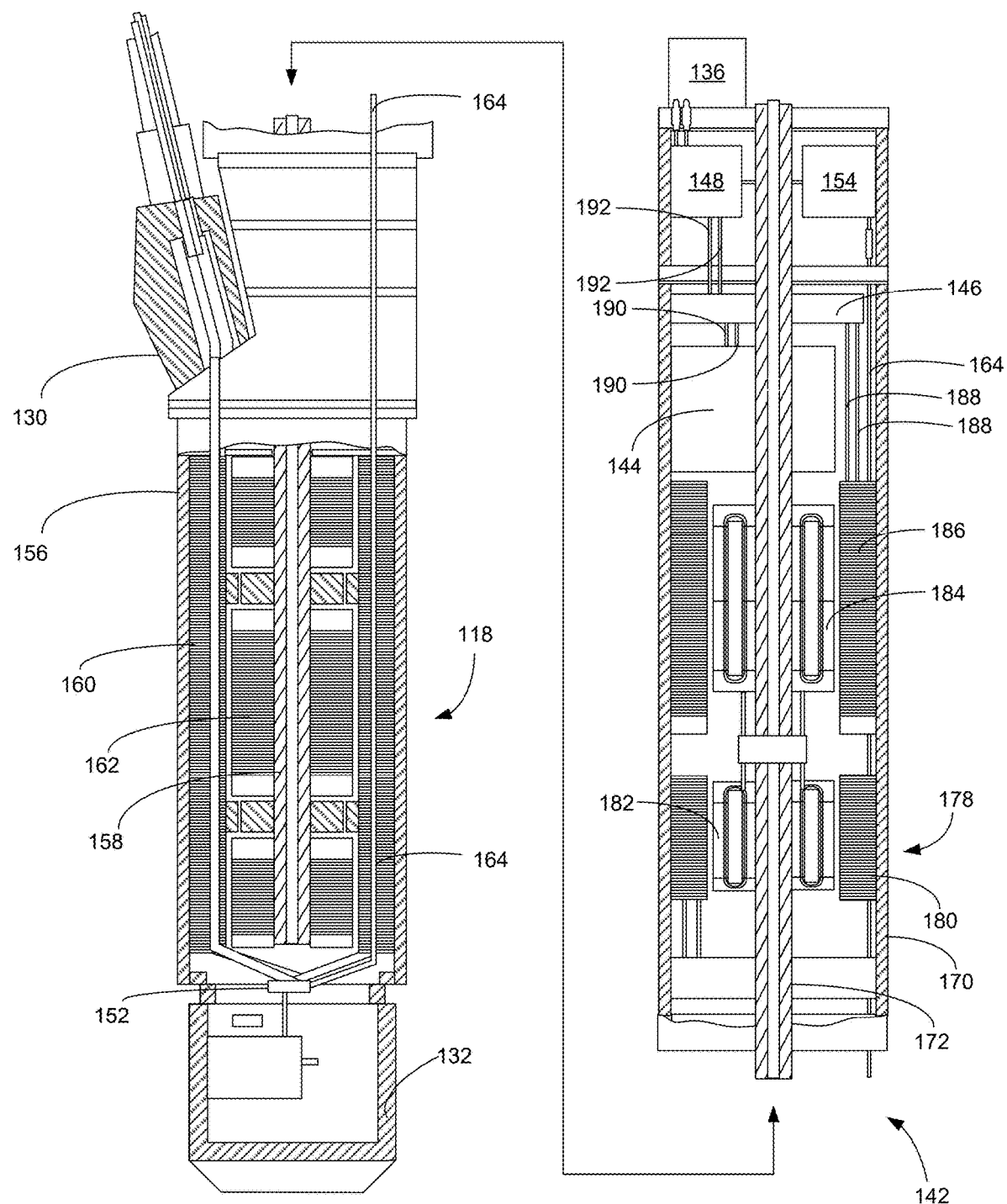
FIG. 4 is a cross-sectional view of a second embodiment of the motor and downhole generator system.

Turning to FIGS. 3 and 4, shown therein are cross-sectional views of the motor 118 and generator module 134. As illustrated in FIGS. 2 and 3, the motor 118 includes a motor housing 156, a motor shaft 158, a motor stator assembly 160, and a motor rotor assembly 162. The motor stator assembly 160 is located adjacent the interior surface of the motor housing 156 and remains fixed relative the motor housing 156. The motor stator assembly 160 includes a motor stator core that is formed by passing magnet wire through slots in a plurality of stacked and compressed laminates to form windings or coils. In the embodiments depicted in FIGS. 3 and 4, the motor stator assembly 160 includes three phase windings that extend through the motor stator core and are connected with the internal wye point connector 152. The wye point connector 152 can provide a source of electrical power to the sensor module 132. The motor shaft 158 is keyed or otherwise connected to the motor rotor assembly 162 and configured for rotation with the motor rotor assembly 162 in response to the coordinated magnetic fields generated by the sequential excitation of the motor stator assembly 160.

A generator control line 164 is connected directly to the wye point connector 152 or indirectly to the wye point connector 152 through the sensor module 132. The generator control line 164 extends internally or externally from the motor 118 to the generator module 134, as depicted in FIGS. 3 and 4.

The generator 142 includes a generator housing 166, a generator stator assembly 168, a generator rotor assembly 170 and a generator shaft 172. The generator rotor assembly 170 is keyed or otherwise connected to the generator shaft 172, which is connected to the motor shaft 158. In this way, the motor 118 rotates the generator rotor assembly 170 by transferring torque from the motor rotor assembly 162 to the generator rotor assembly 170 through the motor shaft 158 and generator shaft 172. The generator shaft 172 can be connected to downstream shafts in the pump 116 and seal section 120 to transmit torque from the motor 118 to those components of the pumping system 100. In exemplary embodiments, the generator housing 166 has a similar cross-sectional area as the motor 118 to permit the generator 142 to be easily connected to the motor 118 without interfering with other components in the relatively small space within the wellbore 104.

In accordance with well-established electromotive principles, the movement of the generator rotor assembly 170 within the generator stator assembly 168 produces an electric current in the generator stator assembly 168. In the embodiment depicted in FIG. 3, the generator rotor assembly 170 includes one or more permanent magnets 174 that rotate within generator stator coils 176 in the generator stator assembly 168. In other embodiments, the generator stator assembly 168 includes permanent magnets and the generator rotor assembly 170 includes generator rotor coils in which electrical current is produced as the generator rotor assembly 170 rotates within the permanent magnets of the generator stator assembly 168.

In the embodiment depicted in FIG. 4, the generator stator assembly 168 has an exciter module 178 that selectively activates and deactivates the output from the generator 142. The exciter module 178 includes exciter field coils 180 and exciter rotor coils 182. When the exciter field coils 180 are energized by the generator control line 164 or another electrical connection from the motor 118, the exciter field coils 180 produce a magnetic field that induces current in the rotating exciter rotor coils 182. The current produced by the exciter rotor coils 182 can then be used to drive primary generator coils 184. The rotating magnetic field produced by the excited primary generator coils 184 induces current in primary stator coils 186 as the electrical output from the generator 142. The use of the exciter module 178 allows the generator 142 to be placed into a passive state in which electricity is not being produced by the generator 142.

In each case, the electrical output from the generator 142 is provided to the charge controller 146 through generator output conductors 188. The charge controller 146 is connected to the battery 144 with battery conductors 190. The load switch 148 is connected to the charge controller with load switch conductors 192. The load switch 148 is also connected directly to the generator control line 164 or the intervening downhole choke 154 (as shown). In the embodiments depicted in FIGS. 3 and 4, the load switch 148, battery 144 and charge controller 146 are contained within the generator housing 166. In other embodiments, one or more of the battery 144, charge controller 146 and load switch 148 are located elsewhere in the pumping system 100, including within the motor 118, the sensor module 132, or in a designated housing within the pumping system 100.

The output from the generator 142 is provided to the charge controller 146, which ensures that the battery 144 is fully charged, while simultaneously providing electric current to the load switch 148 from the battery 144, the generator 142, or both the battery 144 and the generator 142. In response to a switch command signal carried along the generator control line 164, the load switch 148 connects the current from the charge controller 146 to the auxiliary loads 136. The ability to selectively disconnect the auxiliary loads 136 using the switch command signal presents a significant advancement over prior art methods for generator electricity within a downhole pumping system.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

It is claimed:

1. A downhole pumping system for use in producing fluids from a formation to a surface through a wellbore, the downhole pumping system comprising:
   an electric motor;
   a pump driven by the electric motor;
   an auxiliary load;
   a generator module driven by the electric motor and configured to provide power to the auxiliary load, the generator module comprising:
      an electrical generator; and
      a load switch connected between the electrical generator and the auxiliary load, wherein the load switch is configured to connect and disconnect power to the auxiliary load in response to a switch command signal; and a motor drive located on the surface and configured to operate the electric motor, and wherein the switch command signal originates from the motor drive.

2. The downhole pumping system of claim 1, wherein the pumping system further comprises a power cable connected between the electric motor and the motor drive and wherein the switch command signal is carried as a direct current (DC) signal over the power cable.

3. The downhole pumping system of claim 2, wherein the downhole pumping system further comprises a generator control line that is connected between the electric motor and the load switch and wherein the switch command signal is carried on the generator control line.

4. The downhole pumping system of claim 3, wherein the electric motor comprises a wye point connector and the generator control line is connected between the load switch and the wye point connector.

5. The downhole pumping system of claim 1, wherein the generator comprises:
   a generator stator assembly;
   a generator rotor assembly; and
   a generator shaft connected to the generator rotor assembly.

6. The downhole pumping system of claim 5, wherein the generator stator assembly comprises generator stator coils and wherein the generator rotor assembly comprises one or more permanent magnets.

7. The downhole pumping system of claim 5, wherein the generator comprises an exciter module that selectively activates the generator.

8. The downhole pumping system of claim 7, wherein the exciter module comprises:
   exciter field coils, wherein the exciter field coils produce an electromagnetic field when the exciter field coils are energized; and
   exciter rotor coils, wherein the exciter rotor coils produce a generator drive current when the exciter rotor coils are rotated within the electromagnetic field produced by the exciter field coils.

9. The downhole pumping system of claim 8, wherein the generator further comprises rotating primary generator coils that are energized by the generator drive current.

10. The downhole pumping system of claim 9, wherein the generator further comprises primary stator coils that produce current when the energized primary generator coils are rotated inside the primary stator coils.

11. A downhole pumping system for use in producing fluids from a formation to a surface through a wellbore, the downhole pumping system comprising:
   an electric motor;
   a pump driven by the electric motor;
   an auxiliary load;
   a generator module driven by the electric motor and configured to provide power to the auxiliary load, the generator module comprising:
      an electrical generator;
      a load switch connected between the electrical generator and the auxiliary load, wherein the load switch is configured to connect and disconnect power to the auxiliary load in response to a switch command signal;
      a battery; and
      a charge controller connected between the battery and the load switch.

12. The downhole pumping system of claim 11, wherein the charge controller is also connected to the electrical generator and wherein the charge controller is configured to automatically charge the battery with current produced by the electrical generator.

13. The downhole pumping system of claim 12, wherein the charge controller includes an automatic voltage regulator.

14. A downhole pumping system for use in producing fluids from a formation to a surface through a wellbore, the downhole pumping system comprising:
   an electric motor driven by a motor drive located on the surface;
   a power cable connected between the motor drive and the electric motor;
   a pump driven by the electric motor;
   an auxiliary load; and
   a generator module driven by the electric motor and configured to provide power to the auxiliary load, the generator module comprising:
      an electrical generator; and
      a load switch connected between the electrical generator and the auxiliary load, wherein the load switch is configured to connect and disconnect power to the auxiliary load in response to a switch command signal transmitted by the motor drive.

15. The downhole pumping system of claim 14, wherein the generator module further comprises:
   a battery; and
   a charge controller connected between the battery and the load switch.

16. A method of providing electric power to an auxiliary load within a downhole pumping system, the method comprising the steps of:
   providing a generator within the downhole pumping system;
   driving the generator with an electric motor within the downhole pumping system to generate an electric current within the generator; and
   actuating a load switch between the generator and the auxiliary load to selectively conduct the electric current from the generator to the auxiliary load, wherein the step of actuating the load switch further comprises sending a switch command signal to the load switch as a direct current (DC) signal through power cables connected to the electric motor.

* * * * *